United States Patent [19]

Veith et al.

[11] Patent Number: 4,831,693
[45] Date of Patent: May 23, 1989

[54] CLAMP FOR SHEET MATERIAL ARTICLES

[75] Inventors: Gustav G. Veith; Ulrich Veith; Adrian Veith, all of Frasdorf, Fed. Rep. of Germany

[73] Assignee: Veit Transpo GmbH, Landsberg, Fed. Rep. of Germany

[21] Appl. No.: 153,693

[22] Filed: Feb. 8, 1988

[30] Foreign Application Priority Data

Feb. 10, 1987 [DE]  Fed. Rep. of Germany ....... 3704051

[51] Int. Cl.⁴ ..................... A44B 21/00; F16G 11/04
[52] U.S. Cl. .................................. 24/530; 24/136 A; 24/523
[58] Field of Search ..................... 24/523, 530, 136 A, 24/459

[56] References Cited

U.S. PATENT DOCUMENTS

| 110,725 | 1/1871 | Barstow | 24/523 |
| 330,991 | 11/1885 | Mathews | 24/523 |
| 331,088 | 11/1885 | Sackett | 24/136 A |
| 1,605,737 | 11/1926 | Hume | 24/523 |
| 2,109,759 | 3/1938 | Tuchband | 24/136 A |
| 2,704,872 | 3/1955 | Waggoner et al. | 24/530 |
| 4,216,568 | 8/1980 | Anderson | 24/136 A |

FOREIGN PATENT DOCUMENTS 1775847  5/1958  Fed. Rep. of Germany .
2908786  9/1979  Fed. Rep. of Germany .
2949175  6/1981  Fed. Rep. of Germany .

*Primary Examiner*—Victor N. Sakran
*Attorney, Agent, or Firm*—James E. Nilles; Donald C. McGaughey

[57] ABSTRACT

The clamp comprises an inverted U-shaped base having spaced apart legs defining an entrance with a clamping element mounted on one leg of the base for displacement towards and away from a clamping surface on the other leg of the base for clamping a sheet material article thereagainst. The clamping element has an outer surface which is guided on a guide surface disposed on the base leg which is opposite the clamping surface and is retained in contact therewith by means of a tension member. The guide surface has at least one or preferably a plurality of sections extending at an angle or angles relative to the clamping surface.

20 Claims, 1 Drawing Sheet

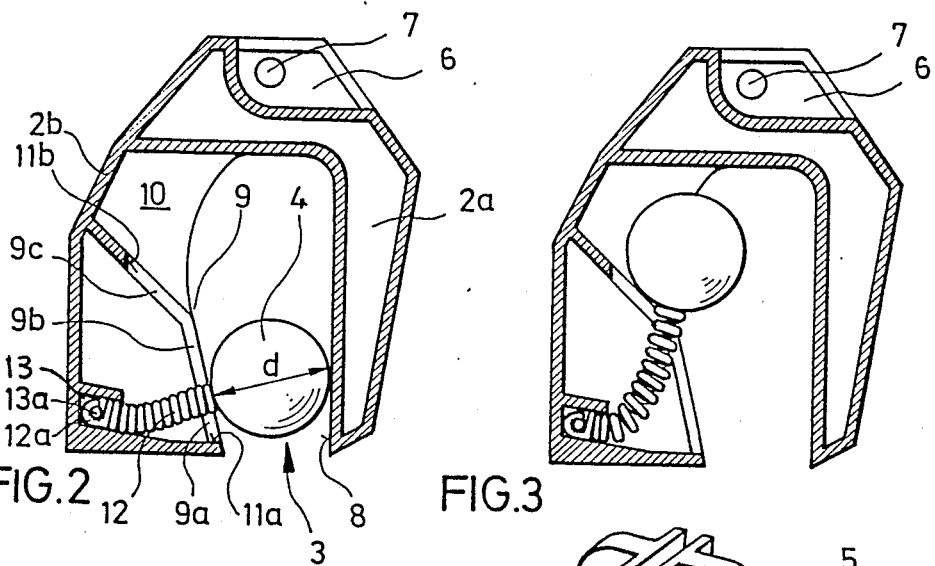
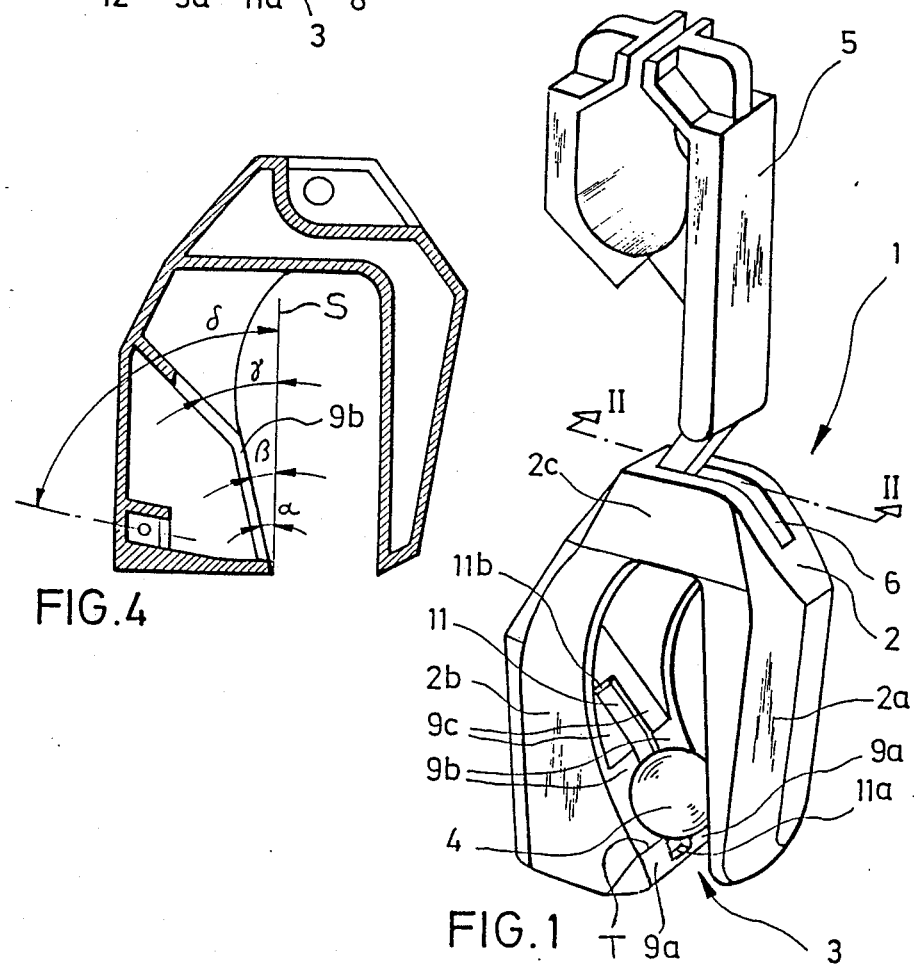

CLAMP FOR SHEET MATERIAL ARTICLES

BACKGROUND OF THE INVENTION

1. Field of the Invention

The invention relates to a clamp for sheet material articles.

2. Description of Prior Art

A clamp of this type is known from DE-U-17 75 847. In this known clamp, the clamping element is formed as a circular disk fixedly connected to a rigid lever arm extending outwards through a slot formed in the wall portion of the clamp defining said guide surface. Outwards of the clamp the lever arm is provided with a knob portion. The lever arm is not connected to the housing of the clamp, but is pivotable about a support provided at the lower end of the slot. As particularly evident from FIG. 1, the lateral boundaries of the clamp extend at a distance from one another substantially corresponding to the width of the circular disk or weight, respectively, so as to prevent lateral movement thereof. The side walls of the housing of the clamp are provided with a slot (mouth opening) adjacent the clamping surface. The width of the slot is substantially smaller than the distance of the guide surface from the clamping surface at the level of the entrance opening.

To initiate clamping, a piece of sheet material is inserted into the mouth opening through the entrance opening so as to enter between the clamping element and the clamping surface. The clamping action for holding the piece of sheet material is exerted exclusively by the weight of the clamping element and the biasing weight of the sheet material. An amplification of the clamping action by vertical pulling forces acting on the sheet material is not intended and obviously scarcely possible. A pulling force exerted on the sheet material would tend to rotate the circular disk, whereby the lever arm would be pivoted towards the upper end of the slot. As a result, the lever arm acts on the biasing weight to lift it out of engagement with the clamping element. As a result, the effect of the biasing weight on the clamping force is considerably reduced. In addition, the clamping element can only be rotated until the lever arm is stopped by the upper end of the slot. Further rotation could only be accomplished by bending the lever arm between the stop at the upper end of the slot and the support, and such bending is not desirable.

The known clamp can only be used in the manner described when the center of gravity of the clamping element lies below the support, which is only the case when clamping relatively thin single layers of a sheet material, and particularly only when the clamp is disposed vertically. Inclination of the clamp causes the clamping action to be automatically released. If a multiple-layer sheet material to be clamped is of an overall thickness causing the lever arm to engage the lower boundary edge of the slot, as shown for instance in FIG. 2 by the phantom lines depicting the release position for single-layer sheet material in which position the lever arm can no longer pivot about the support, the load of the clamping element and the biasing weight is supported on the slot edge so that scarcely any clamping force can be brought to bear. If the thickness of the articles to be clamped increases still further, the clamping action will become unstable because the weight of the knob member, combined with the full length of the lever arm, tends to lift the clamping element off the clamping surface. Even if the knob member is relatively lightweight and the lever arm relatively short, the slightest unintentional contact of these members with another object will be sufficient for releasing the clamping action.

Release of the sheet material from the clamp in any case requires the clamping element to be raised with the aid of the knob member, with the force required for releasing the sheet material increasing in proportion to the strength of the clamping action to be overcome.

DE-A- No. 29 49 175 describes a clamping device for a sheet material designed particularly for use with printed circuit boards. The clamping device comprises a base member formed with a clamping surface and a guide surface disposed opposite one another and converging inwards from the entrance opening. The clamping element is a clamping roller, the axle of which is guided in horizontally extending slots of a U-shaped bracket extending laterally around the base member. The U-shaped bracket contains a counterbearing for one end of a spring, the other end of which is supported on an upper surface of the base member.

In order to insert a printed circuit board into the entrance opening of the base member, the bracket is depressed to thereby compress the spring, permitting the clamping roller to be cammed out of the way in a lateral direction. As the bracket is then released it is pushed upwards by the action of the expanding spring, causing the converging guide surface to displace the clamping element towards the printed circuit board resting against the clamping surface and into a clamping position. In this embodiment of a clamping device, the force of the spring has to be accurately determined with respect to the maximum weight of the printed circuit boards. If the articles to be clamped are too heavy so as to exert an excessive pulling force, the clamping roller may be rotated and move downwards with compression of the spring so as to release the clamped article.

Known from DE-A-No. 29 08 786 is a clamp comprising a loop-shaped bracket of unitary or composite construction, the clamping surface being formed on one leg of the bracket or on a wall to which the bracket is attached. The other leg of the bracket is formed as a guide member and inclined towards the clamping surface, the free end of the guide member cooperating with the clamping surface to define an entrance opening whereat its distance from the clamping surface is smallest.

The clamping element has a guide opening extending therethrough, the cross-sectional shape of which corresponds to that of the guide member to thus permit the clamping element to be slipped onto the guide member. The distance of the guide member from the clamping surface is so selected that the clamping element comes into contact with the clamping surface shortly before arriving at the entrance opening. This implies, however, that the width of the entrance opening has to be noticeably smaller than the radius or the thickness of the clamping element, since the clamping element would otherwise be prevented from coming into contact with the clamping surface.

A sheet material article to be clamped is inserted through the entrance opening into engagement with the clamping element. The clamping element is then displaced along the guide member and away from the entrance opening by manual operation or by the action of the inserted article, so that the sheet material article can proceed to a position between the clamping element and the clamping surface. The clamping element is then returned towards the entrance opening by the action of gravity and/or by the action of a spring, to thereby clampingly retain the article. A pulling force subsequently exerted on the article and tending to pull it out of the entrance opening causes the clamping element to be frictionally entrained so as to clamp the article even more tightly against the clamping surface. As a result, also the intentional release of the clamped article becomes increasingly difficult. In addition, a pulling force exerted on the article will not only tend to displace the clamping element in a radial direction relative to the guide member, but will also tend to rotate the clamping member. This results in the guide opening being tilted relative to the guide member, whereby the intentional release of the article is rendered even more difficult. On the other hand, this tilting leads to increased wear of the guide opening and the guide member, so that the clamping action is impaired. For facilitating the intentional release of a clamped article, it has been proposed to form the guide member and the guide opening of the clamping element, preferably a spherical member, with a circular cross-sectional shape permitting the clamping element to be rotated about the guide member. This construction is intended to facilitate release of the clamped article in lateral directions. This intention neglects the fact, however, that the spherical clamping member is prevented from being rotated when it is clamped or tilted on the guide member in the manner described above.

SUMMARY OF THE INVENTION

It is therefore an object of the invention to provide a clamp which is also suitable for clamping articles of greater thickness and is further of a simple construction ensuring reliable clamping action in any position while permitting a clamped article to be readily released.

By its connection to a flexible tension member, the clamping element of the clamp according to the invention retains its freedom of movement in all directions. In particular, the flexibility of the tension member permits the clamping element disposed between the guide surface and the clamping surface to roll on the clamped article when a pulling force is exerted thereon, so that the clamping action is automatically increased in the case of multiple-layered and thus heavier articles. In addition, the clamping element is also laterally displaceable or can even be rolled sideways (depending on its shape), to thereby permit a clamped article to be readily released in the lateral direction. The punctiform clamping location resulting from the employ of a clamping element in the form of a ball is particularly advantageous when clamping multiple-layer articles. The mounting of the tension element at the level of the entrance opening ensures that the clamping and releasing forces always act substantially in the same manner and direction, irrespective of the thickness of the articles to be clamped. In addition, the clamping force acts with the same reliability on the articles to be clamped in any position-in-space of the clamp.

The tension spring employed as the tension member is commercially available at a low price and combines all of the required properties substantially in an optimum manner.

In the embodiment in which the tension member extends through a slot formed in the guide surface, the clamping element is retained in particularly reliable contact with the guide surface, and a particularly safe guidance of the tension member is achieved.

Sections of the guide surface ensure a particularly reliable clamping action as well as a relatively quick displacement of the clamping element away from the sheet material article as the clamp is being released as well as preventing the clamping element from being pulled out of contact with the clamping surface in spite of the relatively wide entrance opening.

In a further embodiment of the invention, a rest position is provided whereat the clamping element remains at a standstill when not clamping an article and no release force is exerted on the clamping element. The location of this rest position adjacent to the entrance opening is particularly preferred because it reduces the danger of the clamping element being inadvertently displaced from its engagement with the guide surface. If the distance of the guide surface from the mounting location of the tension member decreases towards the rest position, the clamping element returns to its rest position after each clamping operation.

If the distance between the guide and the clamping surface adjacent to the entrance is smaller than the clamping element, considerable augmentation of the clamping force is achieved and the clamping element is still further prevented from dropping out. If at least one winding of the tension spring is received in a recess, the pivoting of the tension spring is permitted only by its flexibility.

In the preferred embodiment, the clamp of the invention is producible in a simple and effective manner.

The clamp according to the invention is particularly suitable for clamping textile articles in the clothing industry, such articles to be conveyed on a conveyor extending along a line of operator's positions. To this purpose the clamp may be provided with a suspension attachment for suspending the clamps according to the invention from a conveyor.

BRIEF DESCRIPTION OF THE DRAWINGS

An embodiment of the invention shall now be described in detail by way of example with reference to the accompanying drawings, wherein:

FIG. 1 shows a perspective illustration of a clamp according to the invention provided with a suspension attachment;

FIG. 2 shows a sectional view taken along the line II—II in FIG. 1;

FIG. 3 shows a view corresponding to FIG. 2, with the clamping element displaced from its rest position; and FIG. 4 shows a view corresponding to FIG. 2, with the clamping element omitted.

DESCRIPTION OF THE PREFERRED EMBODIMENT

FIG. 1 shows a perspective view of a clamp 1 comprising a base member 2 formed as an injection-molded plastic housing having two leg portions 2a, 2b diverging inwards of clamp 1 and interconnected in spaced relation by a head portion 2c in a U-shaped configuration. The free ends of leg portions 2a, 2b define an entrance opening 3 therebetween. A clamping element 4 in the form of a ball is movably mounted in a manner to be described in the space between leg portions 2a and 2b. The surface of ball 4 may be roughened. Head portion 2c has a mounting means for pivotally connecting a suspension attachment 5 thereto. The mounting means includes a pin 7 (FIG. 2) disposed transversely across a slot 6 of housing 2. Suspension attachment 5 serves for suspending clamp 1 from a conveyor rail or other conventional conveyor means.

As particularly evident in connection with FIGS. 2 and 3, the side of leg portion 2a facing towards leg portion 2b is formed with a clamping surface 8 of planar configuration extending from entrance opening 3 to head portion 2c at a constant angle, e.g. in the embodiment described substantially vertical in the suspended position of claim 1 depicted in FIG. 1.

Leg portion 2b is formed as a guide member having a guide surface 9 opposite clamping surface 8. Clamping surface 9 is divided into three sections 9a, 9b and 9c, each having a rectilinear extending guide surface. The angular relationships of sections 9a, 9b and 9c are identified in FIG. 4. In this description, the angles $\alpha$, $\beta$, $\gamma$, and $\delta$ are stated as being in relation to the clamping surface 8. However, for convenience of accurate identification of these angles they are shown in FIG. 4 in relation to a surface S lying in a plane which is in spaced parallel relation to clamping surface 8. First clamping surface section 9a extends from a location adjacent entrance opening 3. It is relatively short and extends inwards of claim 1 at an angle $\alpha$ with respect to clamping surface 8 (or surfaces, FIG. 4, parallel thereto), so that the distance between guide surface 9 and clamping surface 8 increases in the direction towards head portion 2c. Connected to first section 9a is a second section 9b of greater length. Second section 9b extends at an angle $\beta$ with respect to clamping surface 8, this angle being greater than first angle $\alpha$, but smaller than or equal to a self-locking friction angle between ball 4 and guide surface 9. Angles $\alpha$ and $\beta$ could be the same or different and a transition line T will exist between sections 9a and 9b, in theory when angles $\alpha$ and $\beta$ are the same, and in fact when angles $\alpha$ and $\beta$ are different. Second section 9b merges into third section 9c extending at an angle $\gamma$ with respect to clamping surface 8, this angle being greater than angles $\alpha$ and $\beta$. Third section 9c extends into the interior of housing 2, to which purpose leg portion 2b above third section 9c is formed with a recess 10 of a size at least equal to that of ball 4. The phrase "self-locking friction angle" means any angle (of which angle $\beta$ is only an example) which can be chosen from all those angles at which section 9b could set so that the inclined surface thereof is not able to apply any force to clamping ball 4 which would cause ball 4 to move upward and rearwardly toward section 9c. The self-locking friction angle may vary depending on the friction properties of the materials, the weight and the surface finishes of the materials and therefore a specific self-locking friction angle cannot be given but can be determined by those skilled in the art.

As particularly evident in connection with FIG. 1, guide surface 9 is divided in two by a central slot 11 extending from a lower end stop 11a adjacent entrance opening 3 to an upper end stop 11b in the direction towards head portion 2c. A flexible tension member in the form of tension spring 12 projecting through slot 11 acts to retain, guide and pull ball 4 into engagement with guide surface 9. To this purpose one end of tension spring 12 is fixedly connected to ball 4, the other end being fixedly secured at a mounting location 13 (FIG. 2) within housing 2 which is approximately at the level of the entrance opening 3. The portion of spring 12 between mounting location 13 and ball 4 is freely movable. Disposed within mounting location 13 is a pin 13a on which tension spring 12 is anchored by means of an eyelet 12a formed of the last winding of spring 12.

Mounting location 13 is formed as a recess adapted to receive therein in a press fit at least the last full winding of tension spring 12 preceding the free end of leg portion 2b at a slight vertical distance from lower end stop 11a. The axis of mounting location 13, and thus the end of tension spring 12 anchored therein, is inclined at an angle $\delta$ with respect to clamping surface 8. Adjacent mounting location 13, the interior surface of leg portion 2b is inclined at the same angle as the axis of mounting location 13, while extending substantially horizontal as it approaches lower end stop 11a, so that the axis of tension spring 12 is angled towards the interior of clamp 1 in any position thereof.

As particularly shown in FIG. 2, the distances between guide surface 9 and clamping surface 8 are determined in such a manner with respect to the diameter d of ball 4, that in the rest position shown in FIG. 2, ball 4 comes to rest at the transition T from first section 9a to a second section 9b. This transition is spaced the shortest distance from mounting location 13. In this position of ball 4, tension spring 12 is substantially relaxed, its axis being angled upwards, however, due to the inclination of mounting location 13, to thereby retain ball 4 in the rest position.

A sheet material article to be clamped is brought into engagement with the lower end portion of clamping surface 8 and pushed from below through entrance opening 3 into the clamping gap between ball 4 and clamping surface 8, causing ball 4 to move upwards along second section 9b of guide surface 9. The distance between mounting location 13 and guide surface 9 increases steadily along second section 9b from first section 9a towards third section 9c. As a result, the insertion of the sheet material article causes tension spring 12 to be tensioned, so that it tends to return ball 4 towards its rest position as far as permitted by the thickness of the clamped sheet material article. This return force cooperates with the guide surface section 9b extending at the angle $\beta$ towards clamping surface 8 to achieve the secure clamping of the respective article.

This clamping action is still further amplified by a vertical pulling force exerted on the clamped article. Such pulling force acts on ball 4 as a tangential force tending in the conventional manner to rotate ball 4. This rotating force is opposed by the spring's 12 tendency to return to its relaxed state. As a result, ball 4 is displaced towards entrance opening 3, in which direction the distance between guide surface 9 and clamping surface 8 is steadily decreasing, so that a steadily growing clamping force is exerted on the sheet material article. This effect may be further amplified by the provision that housing 2, and particularly leg portion 2a with its clamping surface 8, is of a resiliently yielding construction. In this case, the growing clamping force under the influence of a vertical pulling force exerted on the sheet material article as described above results in leg portion 2a being resiliently deformed outwards, so that its return force leads to an even stronger clamping force. Due to this deformation, the angular position of first section 9a approaches the self-locking state to thereby increase the clamping action.

This effect is obtainable both in the case of relatively thick sheet material articles, for instance multiple-layered textile materials, in which case ball 4 remains on second section 9b, and in the case of thinner sheet materials, for instance a single-layer textile web. As shown in FIG. 2, the distance between guide surface 9 and clamping surface 8 decreases steadily along first section 9a to minimum distance within entrance opening 3. In the case of a clamped article having a relatively small thickness, ball 4 is displaced upwards only a short distance from its rest position, so that a pulling force exerted vertically downwards on the clamped article causes ball 4 to be displaced downwards beyond its rest position and into engagement with first section 9a. As a result, leg portion 2a is cammed laterally out of the way in the manner already described, so that also a relatively thin sheet material article may be clamped with a progressively increasing clamping force. The distance between mounting location 13 and guide surface 9 increases along first section 9a in the direction towards entrance opening 3, so that spring 12 is tensioned. This effect, together with the lower end stop 11a of slot 11 and the additional fact that the axis of spring 12 is angled inwards even when spring 12 engages lower end stop 11a, prevent ball 4 from escaping through entrance opening 3.

For releasing the clamp, ball 4 is pushed into housing 2 in the manner depicted in FIG. 3. In this case, ball 4 is initially displaced over the remaining portion of second guide surface section 9b and then onto third section 9c of guide surface 9. Along this path the distance between guide surface 9 and mounting location 13 increases, as a result of which the tension of spring 12 is also increased. After ball 4 has passed onto third section 9c, the considerably greater inclination angle γ of this section causes it to be quickly released from its engagement with the clamped article as it enters recess 10. In this manner, the clamped article can be readily unclamped. After the article has been unclamped, ball 4 may be released so that it quickly returns to its rest position shown in FIG. 2 by the action of the contracting tension spring 12.

A further possibility of freeing the sheet material article from the clamping gap consists in pulling it laterally out of the clamp in a direction substantially perpendicular to the plane of the drawings. In this case, ball 4 is subjected to tangential forces tending to roll it in the direction of the pulling force laterally away from slot 11. As a result, spring 12 is brought into engagement with the lateral boundary surfaces of the slot, and the outermost windings of the helical spring are caused to open in the manner of a fan, permitting the ball to roll over a limited distance in the lateral direction. At the same time, the self-locking frictional forces of second section 9b are no longer active, so that the sheet material article may be withdrawn without difficulty. The lateral unclamping operation can be carried out even when the clamping action has been previously increased by exerting a vertical pulling force on the clamped article.

In the case of a particularly preferred embodiment of clamp 1, in which the guide surface and the ball consist of the same plastic material, for instance, glass fiber-reinforced polyamide, the various angles may have the following mangitudes: angle α about 10°, angle β about 15°angle γ about 45°, and angle δ 80°.

The spring force of the tension spring is so selected that the clamp can be readily released, while a proper guidance of the ball is still ensured. Within certain limits a somewhat greater angle of the guide surface may be compensated by a stronger spring.

In a modification of the preferred embodiment, the guide surface may comprise only a single section or only two sections. If the first and third sections are omitted, the guide surface as a whole should be inclined by an angle smaller than or equal to the self-locking friction angle. If only the first section is omitted, the section inclined at this angle should extend to the location of the entrance opening, whereas the third section may extend at a stronger inclination as in the preferred embodiment. Also possible is an arcuate configuration of the guide surface with one or several radii of curvature. Likewise, the distance of the guide surface from the mounting location of the tension member may be the same at all points of the guide surface. The tension spring may be replaced by a rubber strand to achieve a similar effect. The tension member may also be pivotally mounted about a pin anchored within the housing. Finally, the clamping element may be formed with one or two arcuate surface portions at its point of contact with the guide surface and/or the clamping surface. Also possible is a polygon configuration of the clamping element, with planar surfaces of a greater or smaller size or more or less flattened contact points or edges. The clamp according to the invention may finally be employed in any situation requiring the use of a reliable and readily releasable clamp, the clamping action of which may, if need be, be further increased by exerting a pulling force on the clamped article.

What is claimed is:

1. A clamp for holding sheet material articles comprising:
    a base member having spaced apart first and second legs which terminate in free end portions spaced apart to define a sheet material entrance opening therebetween and a sheet material receiving space in said base member;
    a clamping surface on one of said leg members facing into said sheet material receiving space;
    a guide surface on the other of said leg members facing into said material receiving space and in spaced generally facing relation to said clamping surface, said guide surface having a slot therein extending from a point adjacent said free end toward said base member and diverging inwardly from said entrance opening so that said material receiving space has an interior width greater than the width of said entrance opening;
    a movable clamping element positioned in said material receiving space and having a first portion supported on said guide surface and a second portion cooperating with said clamping surface to define an openable and closable clamp gap therewith;
    a flexible tension member having one end mounted on said other leg member and having its other end projecting through said slot into said material receiving space and connected to said clamping element, said flexible tension member retaining said clamping element first portion in contact with said guide surface as said clamping element moves into said material receiving space to open said clamp gap as sheet material is inserted into said entrance opening.

2. A clamp according to claim 1, characterized in that said tension member is a tension.

3. A clamp according to claim 2, characterized in that said mounting location for said tension spring is formed as a recess adapted to receive therein at least one complete winding of said tension spring.

4. A clamp according to claim 2, characterized in that the longitudinal axis of said tension spring is angled upwards in said rest position.

5. A clamp according to claim 1, characterized in that said guide surface comprises at least one section extending at an angle $\beta$ relative to said clamping surface which is smaller than or equal to a self-locking friction angle.

6. A clamp according to claim 1, characterized in that a section of said guide surface facing away from said entrance opening extends at an angle $\gamma$ relative to said clamping surface which is greater than a self-locking friction angle.

7. A clamp according to claim 1, characterized in that said guide surface comprises a section adjacent said entrance opening and extending at an angle $\alpha$ relative to said clamping surface which is smaller than a self-locking friction angle.

8. A clamp according to claim 5, 6 or 7, characterized in that said guide surface extends rectilinear at said first and/or second and/or third sections.

9. A clamp according to claims 5, 6 or 7, characterized in that said first and second sections of said guide surface are disposed on the surface of said base member, and said third section in a recess.

10. A clamp according to claim 1, characterized in that a portion of said guide surface adjacent said entrance opening extends at the smallest distance from said mounting location to thereby define a rest position for said clamping element, whereat said clamping element is simultaneously in contact with said clamping surface.

11. A clamp according to claim 10, characterized in that said smallest distance of said guide surface from said mounting location is defined adjacent said entrance opening by the respective end portion of said section extending at a self-locking friction angle.

12. A clamp according to claim 1, characterized in that the distance of said guide surface from said mounting location increases with the increasing distance from said entrance opening.

13. A clamp according to claim 1, characterized in that adjacent said entrance opening, the distance of said guide surface from said clamping surface is smaller than the thickness of said clamping element, said base member and/or said clamping element being of a resiliently yielding construction.

14. A clamp according to claim 1, characterized in that said mounting location is inclined at an angle relative to said clamping surface.

15. A clamp according to claim 1, characterized in that said base member is of U-shaped configuration, said clamping surface being formed on one leg, and said guide surface on the other leg of said U-shaped base member designed as a guide portion.

16. A clamp according to claim 1, characterized in that said base member is formed as a housing composed of injection-molded plastic components.

17. A clamp according to claim 1, characterized in that said clamping element consists of plastic.

18. A clamp according to claim 1, characterized in that it is provided with mounting means for mounting a suspension attachment.

19. A clamp according to claim 1 wherein said one end of said flexible tension member is mounted on one of said legs adjacent said free end thereof at a mounting location approximately at the level of said entrance.

20. A clamp according to claim 1 wherein said guide surface comprises at least two sectors, one of said sectors being adjacent said entrance and facing into said material receiving space at a self-locking friction angle relative to said guide surface, the other of said sectors being remote from said entrance and facing into said material receiving space at an angle relative to said clamping surface that is greater than said self-locking friction angle, said other sector extending away from said clamp surface a distance sufficient to define a clamping element receiving recess in said clamp laterally offset from and open to said material receiving space.

* * * * *